US006272429B1

(12) United States Patent
Dansby

(10) Patent No.: US 6,272,429 B1
(45) Date of Patent: Aug. 7, 2001

(54) DETAILED INFORMATION DATABASE MANAGEMENT SYSTEM

(76) Inventor: Ronnie Dansby, 506 24th St., NE., Washington, DC (US) 20002

( * ) Notice: Subject to any disclaimer, the term of this patent is extended or adjusted under 35 U.S.C. 154(b) by 0 days.

(21) Appl. No.: 09/186,168

(22) Filed: Nov. 5, 1998

Related U.S. Application Data

(60) Provisional application No. 60/069,520, filed on Dec. 15, 1997.

(51) Int. Cl.[7] .............................. G01C 21/00
(52) U.S. Cl. .............................. 701/202
(58) Field of Search .............................. 701/207, 208, 701/209, 211, 202; 340/989, 995

(56) References Cited

U.S. PATENT DOCUMENTS

| | | | |
|---|---|---|---|
| 2,857,687 | 10/1958 | Erdman | 434/153 |
| 5,549,332 | 8/1996 | Judson | 283/34 |
| 5,559,520 | 9/1996 | Barzegar et al. | 342/357 |
| 5,559,707 | 9/1996 | DeLorme et al. | 701/200 |
| 6,047,280 * | 4/2000 | Ashby et al. | 701/208 |

OTHER PUBLICATIONS

Arikawa, Masatoshi, "Personal Dynamic Maps Based on Distributed Geographic Information Servers", IEEE Vehicle Navigation and Information Systems Conference Proceedings, 1994, pp. 591–596.*
Schulz, Wolfgang, Extension of a Personal In–Car Information Centre by Navigation and Cellular Communication, 5th IEEE International Conf. on Universal Personal Communications, 1996, pp. 936–940.*
Clowes, D. J. "Bus Stop Information—Experience in the Deregulated Environment", Public Transport Electronic System, Conf. Publi. No. 425. May 1996, pp. 64–68.*
Gance, D. "A New Generation of Passenger Information Systems: A Single Core Database and Easy Tools for Consulting", Public Transport Electronic Systems, Conf. Publ. No. 425, pp. 87–89.*

Sweeney, Jr. Lawrence et al. "Travinfo: A Progress Report", Vehicle Navigation & Information Systems Conference Proceedings. 1994, pp. 315–320.*

Sommerville, Fraser, et al. "Reliable Information in Everyone's Pocket—A Pilot Test", 1994 IEEE 44th Vehicular Technology Conf. Jun. 1994, pp. 425–428.*

Hellaker, Jan et al. "Real–time Traveller Information—In Everyone's Pocket?!—A Pilot Test using Hand–Portable GSM Terminals", IEEE–IEE Vehicle Navigation & INformation Systems Conf. VNIS '93, 1993, pp. 49–52.*

* cited by examiner

*Primary Examiner*—Gregory C. Issing
(74) *Attorney, Agent, or Firm*—Richard C. Litman

(57) ABSTRACT

A detailed information database management system for routing patrons accurately within the limits of a jurisdiction from a point of origin to a point of destination. The system utilizes a comprehensive database having all public transportation routes crosslinked with all points of interest or waypoints, business addresses, entertainment locations, etc. within the jurisdiction. The system provides any transportation official, such as dispatcher, area supervisor, driver, etc., immediate access to the database via a computer. All forms of computers are engaged in accessing the database information. Examples of such are desktop computers and network server computers, as well as an array of portable computers, such as, but not limited to, laptops, palm tops, and personal digital assistants (PDAs). The information contained in the database is compiled in a user friendly format, and is accessible via several software applications. Typically, a patron inquires to a bus operator as to which route must be taken for the instant point of origin to a destination point. The bus operator accesses the database via a PDA and surrenders the information to the patron. Alternatively, the bus operator may communicate with a base station dispatcher or a roving area supervisor and gain the information via a radio link.

6 Claims, 5 Drawing Sheets

DETAILED INFORMATION DATABASE MANAGEMENT SYSTEM

CROSS-REFERENCE TO RELATED APPLICATION

This application claims the benefit of U.S. Provisional Patent Application Ser. No. 60/069,520, filed Dec. 15, 1997.

BACKGROUND OF THE INVENTION

1. Field of the Invention

The present invention relates to a computer assisted system and method for accurately disseminating regional geographic database information.

2. Description of Related Art

Local jurisdictions experience significant residential and commercial growth over time. As developments are completed, new residents and businesses relocate into the city. New streets are constructed that do not yet appear on any city map. Local jurisdictions suffer from high congestion, prompting many people to use publicly available transportation. Oftentimes, persons who are more accustomed to personal vehicle usage find it also necessary to utilize the publicly available transportation. Likewise, travelers tend to use public transportation because of their unfamiliarity of the local roadways and ordinances.

In any event, the local jurisdiction must have accurate, precise, and up-to-date information to appropriate operational staff such as road supervisors, dispatchers, and operators. Many times the lack of information regarding new businesses or locations can impede passenger boardings or inconvenience the traveling public when it results in misinformation. The customer may not even realize that the street he or she is looking for is not on any map and so it is not understood why the transit operator or supervisor has not heard of it.

The prior art discloses many attempts to provide adequate database dissemination, however, to no avail. The prior art is represented by the following patents of interest.

U.S. Pat. No. 2,857,687, issued on Oct. 28, 1958 to Francis H. Erdman, describes an aid for classifying and selecting listed information from printed media, such as directories, maps, etc. Erdman does not suggest a detailed information database management system according to the claimed invention.

U.S. Pat. No. 5,549,332, issued on Aug. 27, 1996 to Nancy L. Judson, describes a device for assisting travelers in determining the best or more appropriate route to take; particularly, the Judson device consists of a transparent map overlay allowing the traveler to mark and trace a route without permanently altering a map. Judson does not suggest a detailed information database management system according to the claimed invention.

U.S. Pat. No. 5,559,520, issued on Sep. 24, 1996 to Farhad Barzegar et al., describes a global pointing system (GPS) for use in vehicles for tracking and determining geographical position relative to a satellite network. Barzegar et al. do not suggest a detailed information database management system according to the claimed invention.

U.S. Pat. No. 5,559,707, issued Sep. 24, 1996; to David M. DeLorme et al., describes a computer aided routing system for preparing and mapping routes based on user specific input information. Delorme et al. do not suggest a detailed information database management system according to the claimed invention.

Nevertheless, none of the above inventions and patents, taken either singly or in combination, is seen to describe the instant invention as claimed.

SUMMARY OF THE INVENTION

The present invention is a detailed information database management system for routing patrons accurately within the limits of a jurisdiction from a point of origin to a point of destination. The system utilizes a comprehensive database having all public transportation routes crosslinked with all points of interest or waypoints, business addresses, entertainment locations, etc. within the jurisdiction. The system provides any transportation official, such as dispatcher, area supervisor, driver, etc., immediate access to the database via a computer. All forms of computers are engaged in accessing the database information. Examples of such are desktop computers and network server computers, as well as an array of portable computers, such as, but not limited to, laptops, palm tops, and personal digital assistants (PDAs). The information contained in the database is compiled in a user friendly format, and is accessible via several software applications.

Typically, a patron inquires to a bus operator as to which route must be taken for the instant point of origin to a destination point. The bus operator accesses the database via a PDA and surrenders the information to the patron. Alternatively, the bus operator may communicate with a base station, dispatcher or a roving area supervisor and gain the information via a radio link.

Accordingly, it is a principal object of the invention to provide a detailed information database management system.

It is another object of the invention to provide a convenient database management system for obtaining and disseminating routing information to a patron.

It is a further object of the invention to provide a method for obtaining and disseminating routing information to a patron.

Still another object of the invention is to provide an affordable and economical system and method for equipping a mass transit system to serve the public more efficiently.

It is an object of the invention to provide improved elements and arrangements thereof in a detailed information database management system for the purposes described which is inexpensive, dependable and fully effective in accomplishing its intended purposes.

The above described and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
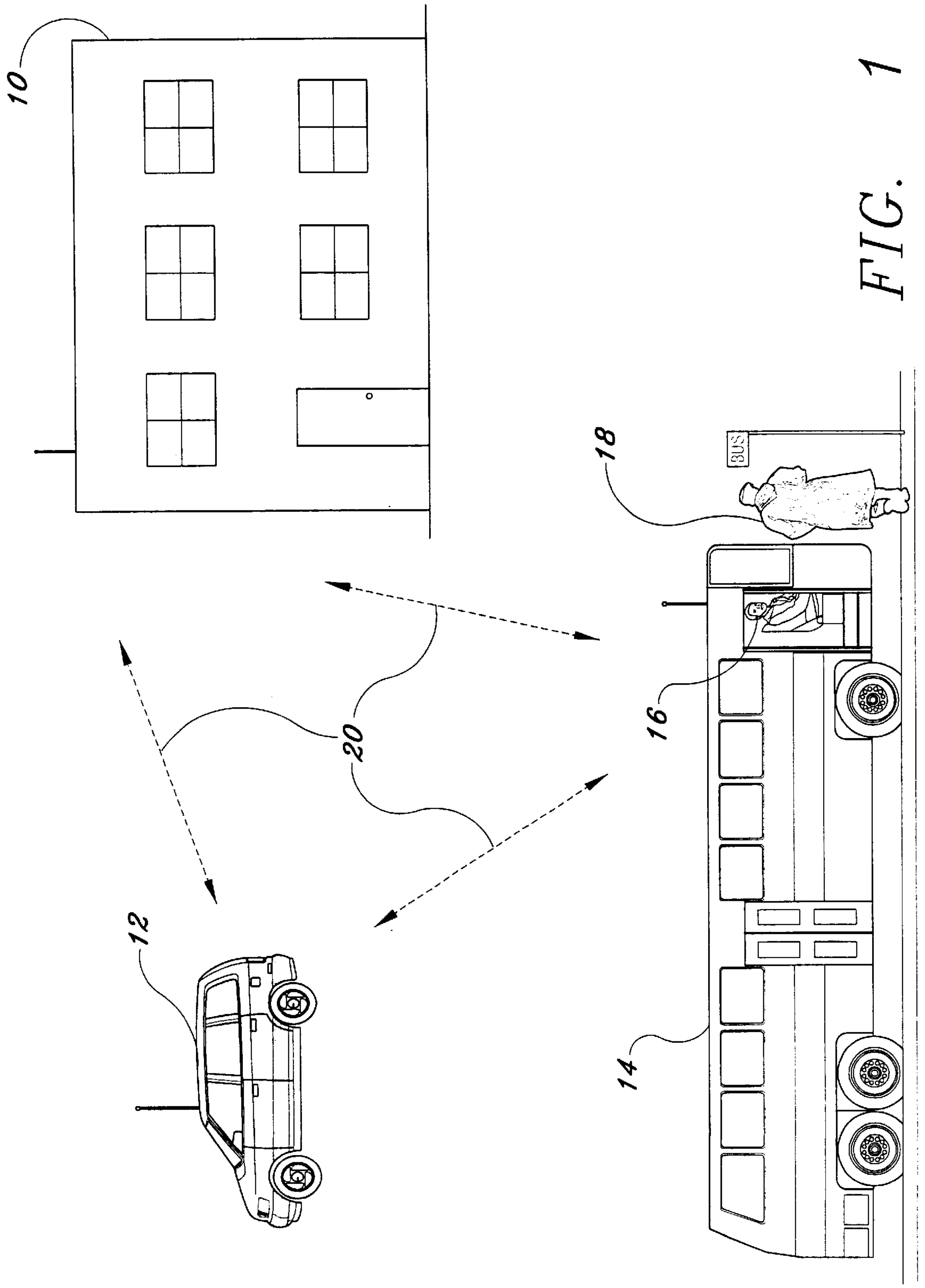
FIG. 1 is a diagrammatic overview of the system utilizing the detailed information database management system of the present invention.

The present invention illustrates a detailed information database management system for identifying, accessing, and disseminating directional information. In the accompanying drawings along with the following disclosure, the full scope of the claimed invention is addressed. Overall, as represented in FIG. 1, the instant invention provides immediate and accurate information concerning a jurisdiction, and the mass transit system that serves it. In FIG. 1, a mass transit system is illustratively shown as a base station 10, a roving area supervisor 12, and transportation vehicles, such as typically a bus 14. The bus 14 is driven by a bus operator 16. Between the bus 14, the supervisor 12 and the base station 10 is a radio link, generally shown as air waves 20. The radio link 20 provides the bus operator 16 with communications allowing reports of inclement weather, accidents, vehicle failure, etc.

Figure 2:
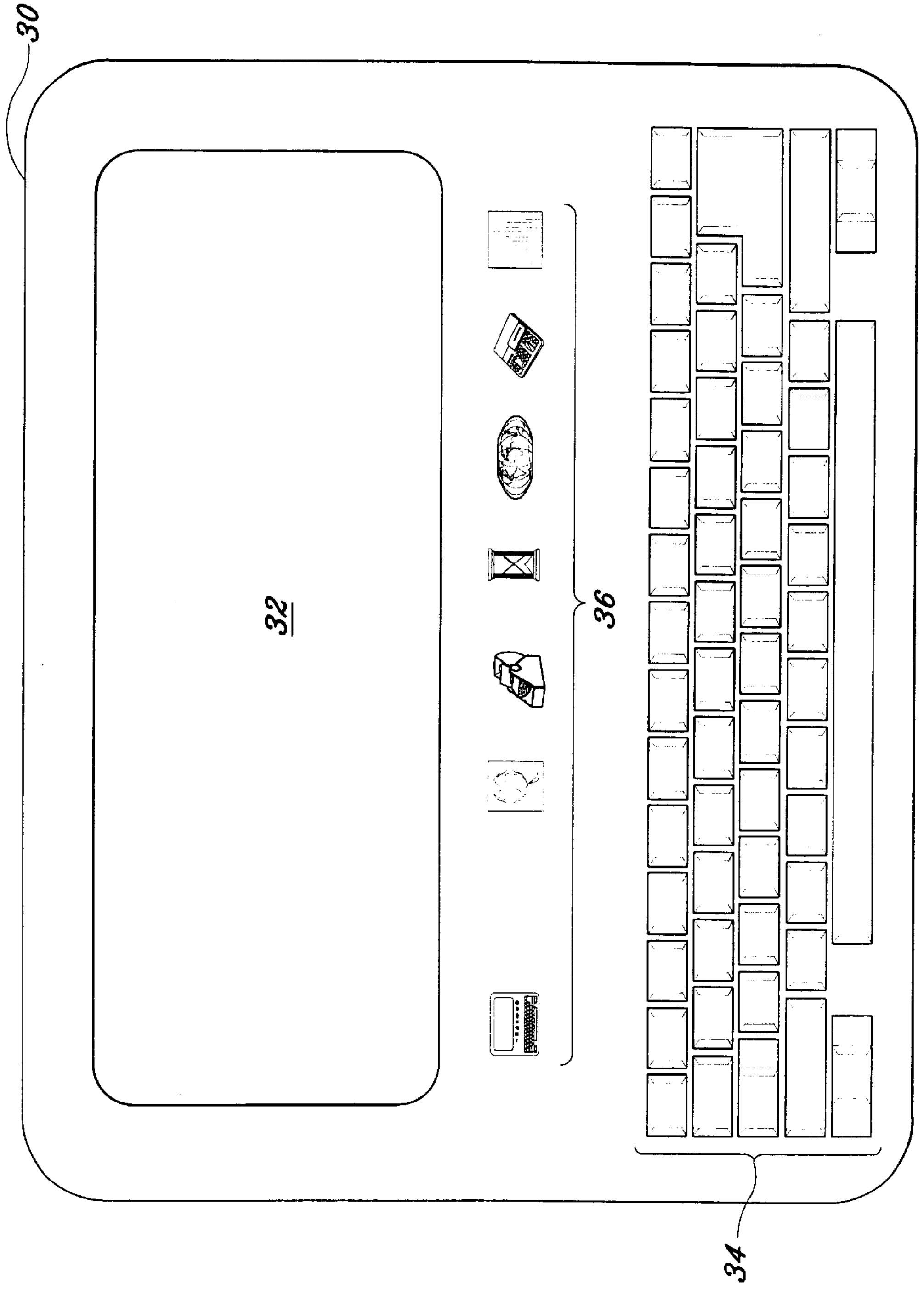
FIG. 2 is a diagrammatic representation of a portable computer for accessing the database of the detailed information database management system of the present invention.

Also, a user of the mass transit system, patron 18, awaits at a bus stop. If by chance the patron 18 is unsure of how to reach his destination, patron 18 may ask the bus operator 16, via a conversation, whether or not this route is the appropriate route. The bus operator 16 then can give the appropriate information back to the patron 18. If the bus operator 16 is unaware of the patron 18 destination, the bus operator 16 uses a portable computer, such as a personal digital assistant (PDA) 30, as shown in FIG. 2. The PDA 30 includes a display 32, a keyboard 34, and a plurality of function keys 36 (peculiar to each conventional type portable computer).

Figure 3:
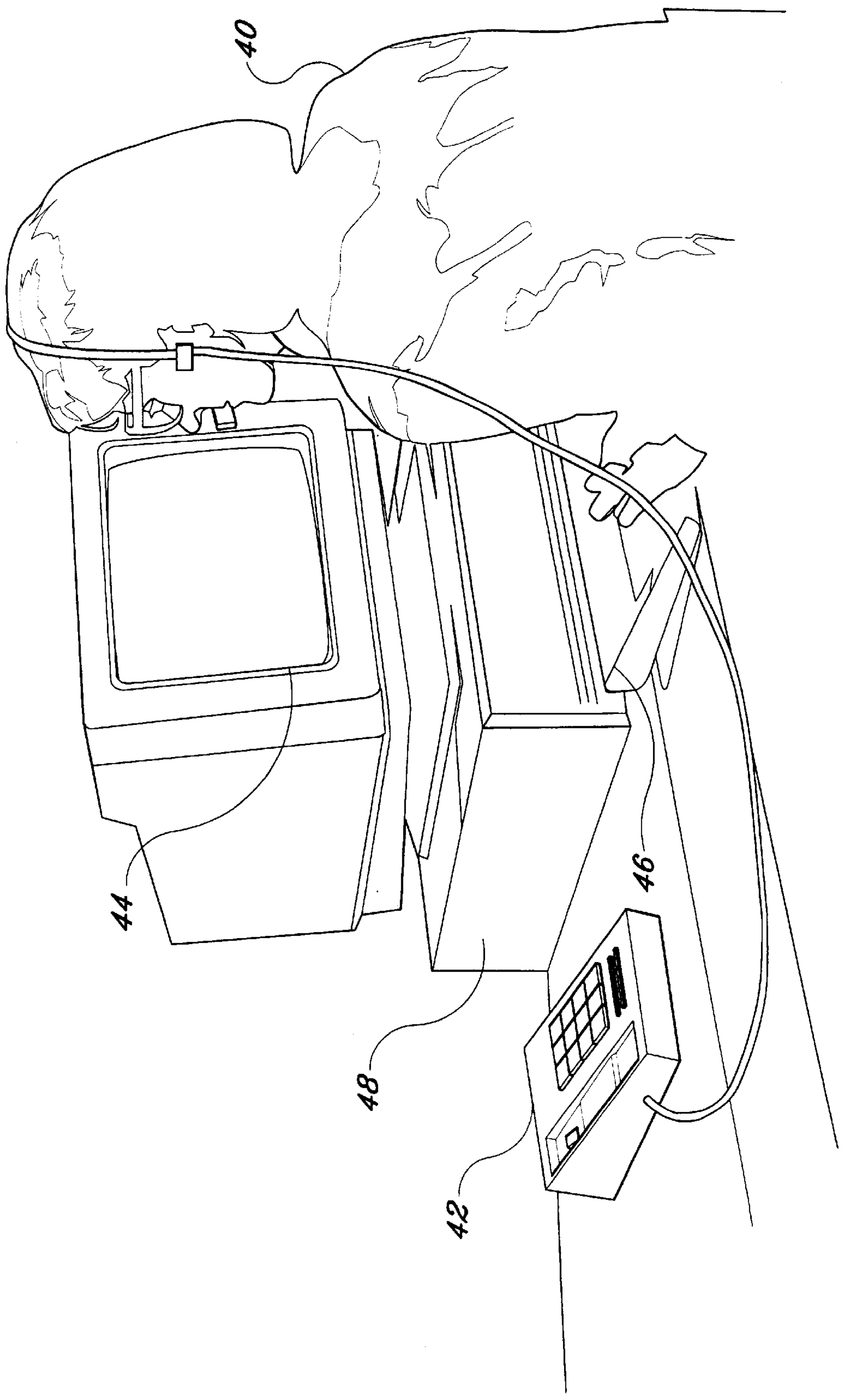
FIG. 3 is a diagrammatic representation of a desktop type computer for accessing the database of the detailed information database management system of the present invention.

On the other hand, the bus operator 16 may need to contact the supervisor 12 who also uses a portable computer such as PDA 30 via radio link communication. The purpose of contacting a supervisor 12 is a choice of economics for a given jurisdiction; e.g. rather than purchasing a great magnitude of portable computers (one for each bus operator 16), a lesser number would be purchased for the roving area supervisors 12. The bus operator 16 also has an option of communicating with the base station 10. FIG. 3 illustrates a typical dispatcher 40 utilizing a desktop type computer for accessing the information requested by the bus operator 16 via a radio link communication device 42. The dispatcher 42 uses a desktop computer having a display 44 for displaying the information. The dispatcher 40 inquires the computer via a keyboard (or other input type device) 46 to a central processing unit 48.

Figure 4:
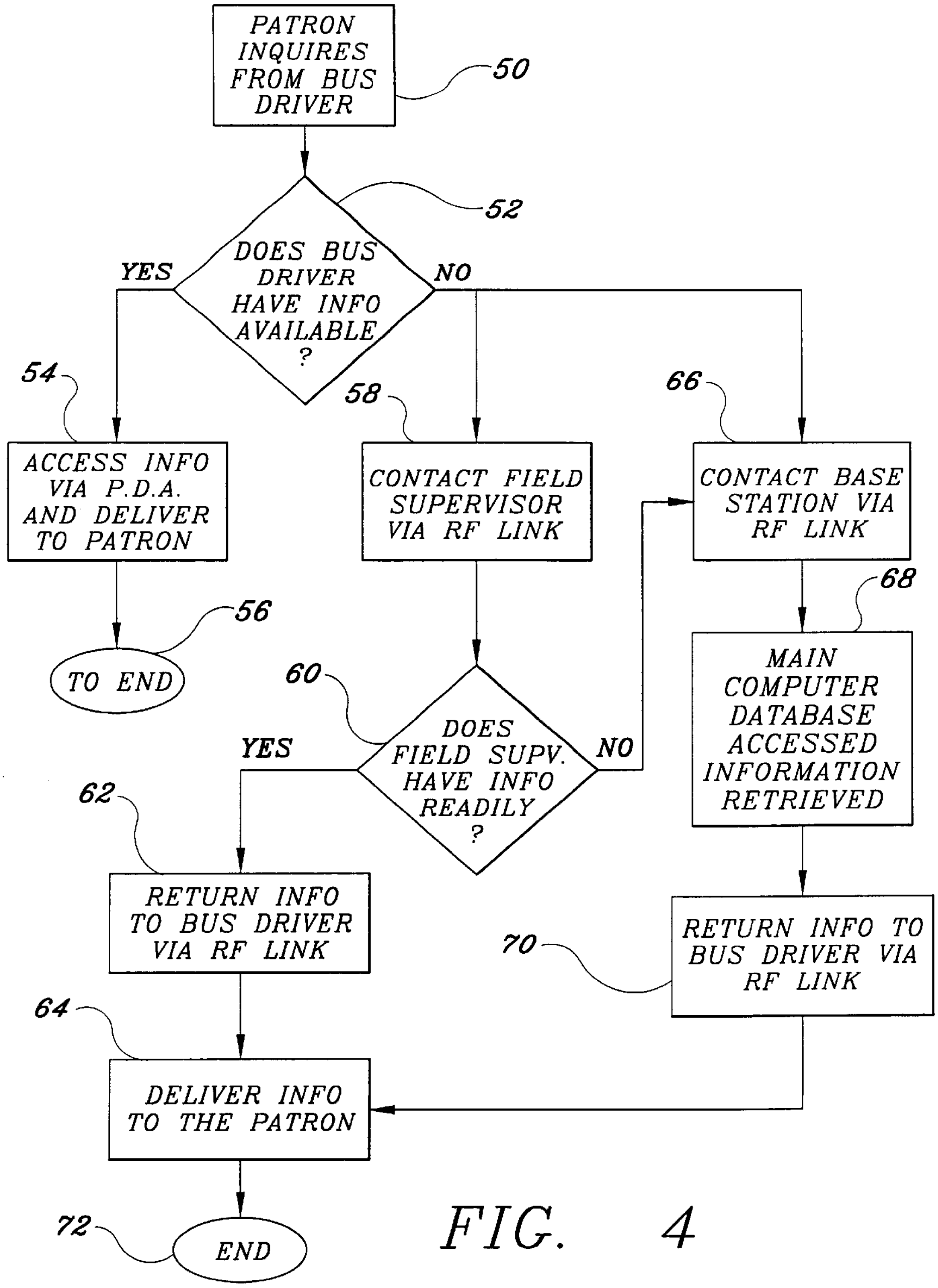
FIG. 4 is a flow diagram of the overall system utilizing the detailed information database management system of the present invention.
Figure 5:
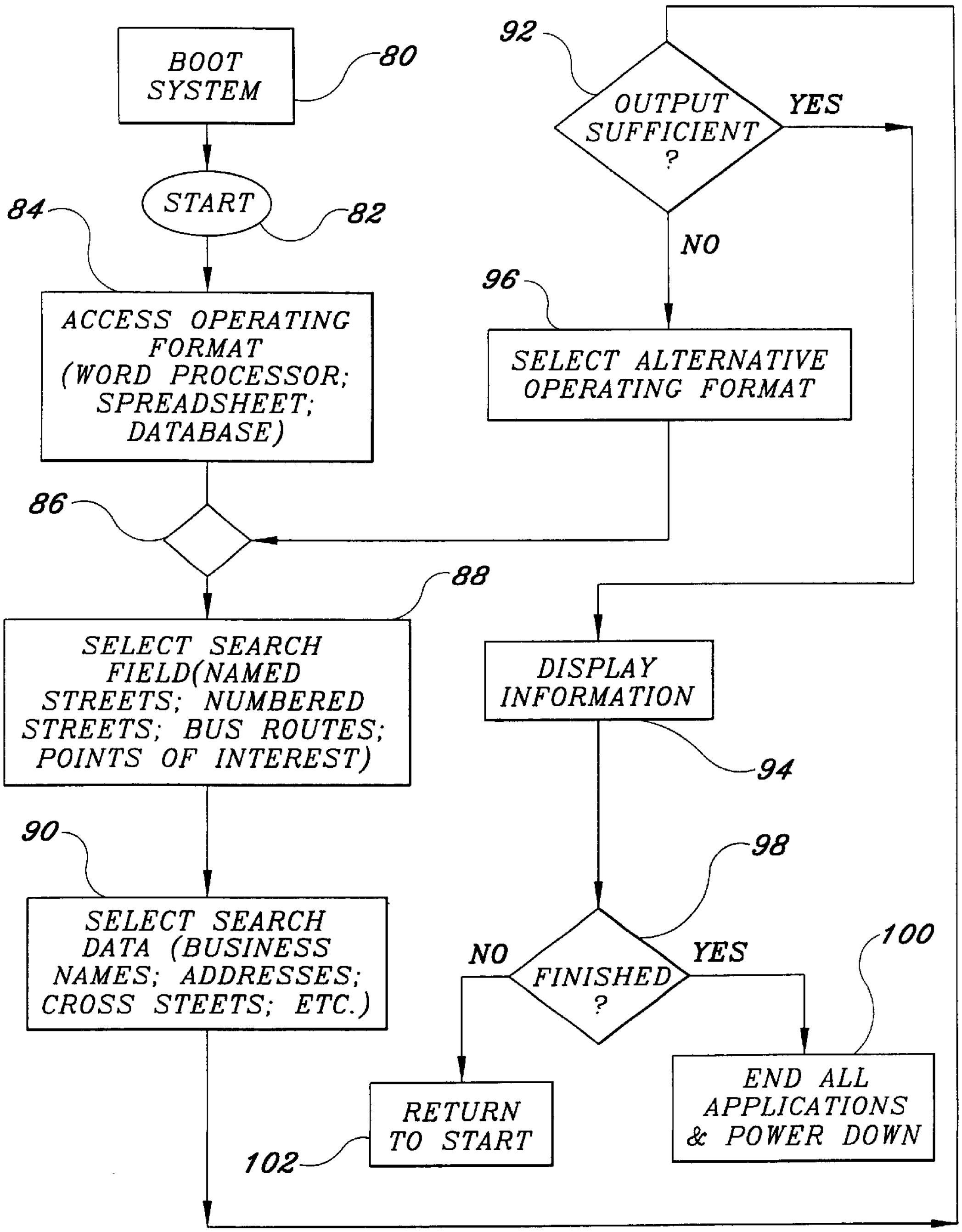
FIG. 5 is a flow diagram of the detailed information database management system of the present invention.

FIGS. 4 and 5 are flow diagrams showing the steps of relaying information to a patron 18 and acquiring information from the database system. FIG. 4 starts with block 50 having the patron 18 request information from the bus driver 16. Question block 52 determines whether the bus driver 16 is adequately prepared to handle the question from the patron 18. If the bus driver 16 is prepared, that is answer YES which leads to block 54. At block 54 the driver 16 uses the PDA 30 and instructs the patron 18 accordingly. The system is brought to the end at block 56. If the driver 16 is unprepared, the answer at block 52 is NO and the driver 16 has two options. Under one option, the driver 16 contacts the roving area supervisor 12 via an RF link 20 as shown in block 58. The question block 60 determines whether the supervisor 12 is adequately prepared to handle the question from the patron 18.

If the supervisor 12 is prepared, that is answer YES which leads to block 62. At block 62 the supervisor 12 uses the PDA 30 and instructs the patron 18 via the driver 16 at block 64 accordingly. Under a second option, the supervisor 12 or the driver 16 contacts the dispatcher 40 at base station 10 via RF link 20, shown as block 66. The dispatcher 40 responds to the inquiry by accessing the database at block 68. Upon gaining the desired information, the dispatcher 40 relays the information to the driver 16 via an RF link 20, block 70, who thereby instructs the patron 18 with the adequate directions at block 64. In both of the options the system is terminated at block 72.

FIG. 5 illustrates the system steps for accessing the information. As with all conventional computers a power on mode or "boot system" begins at block 80. The data acquisition is then started at block 82. Depending on the criteria given by the patron 18, the user of the system, namely the driver 16, the supervisor 12, or the dispatcher 40 selects the operating format in which to run the computer 30 or 48. This selection is accomplished at block 84, and the user chooses from a conventional wordprocessor, spreadsheet, or entries from a database. Block 86 is a standard pass through node of the flow diagram of FIG. 5. Once the operating format has been chosen, a search field is accessed at block 88. In block 88 the user establishes the category of which the computer 30, 48 will translate the desired information. That is, the user directs the system to search under street names, street numbers, points of interest or waypoints, transportation routes, etc at block 90.

Upon entering the category, the user then searches the data of computer 30, 48 by inputting the specific inquiry. This inquiry is a specific street name or intersection of streets, business names or addresses, etc. Once the inquiry is present, the user issues a command to begin the search. The results of the search are then displayed on display 32, 44. Block 92 prompts the user to determine whether the results on the display 32, 44 are adequate for the patron 18. If the results are sufficient, block 94 displays the information to be relayed to the patron 18. If the information is inadequate, then block 96 allows a different operating format to be used as a basis for conducting the information search.

Once the alternative operating format is selected, the system is returned to node 86 to resume and research the chosen parameters. Following block 94 question block 98 determines whether all inquires are completed. If YES then block 100 provides the instructions to end all computer applications and shut the system down. If NO then the system is returned to the start via block 102. Conventional software applications provide the basis for this information management for a jurisdiction to more effectively and efficiently sustain the needs of the patrons 18. Conventionally, computer system utilizing state of the art operating systems and software applications are well suited for this jurisdictional information dissemination.

It is to be understood that the present invention is not limited to the embodiments described above, but encompasses any and all embodiments within the scope of the following claims.

I claim:

1. A system for directing public transportation patrons to a destination location within a jurisdiction serviced by a public transit facility, said system comprising:

first digital computer means disposed aboard a public transit unit, said first digital computer means having a first display for processing and manipulating first data by an operator of the transit unit in response to a personal inquiry posed by a public transportation patron;

second digital computer means located remotely from the transit unit, said second digital computer means having a second display for processing and manipulating second data by a roving transit employee in response to an inquiry posed by the transit unit operator;

first and second storage media respectively coupled to said first and second digital computer means for respectively storing said first and second data;

means for communicating between the transit unit operator and the roving transit employee; and a first and second database for respectively providing said first and second data as a plurality of sets of electronic entries for respective presentation on said first and second display;

said sets of electronic entries depicting scheduled public transportation routes having identified waypoints crosslinked to route intersections at geographic locations along the transportation routes within a preselected jurisdiction, said identified waypoints depicted in said sets of electronic entries being stored in said storage media coupled to said digital computer means.

2. The system according to claim 1, wherein said first and second digital computer means are a portable computer.

3. The system according to claim 2, wherein said portable computer is a personal digital assistant.

4. The system according to claim 1, further including:

a third digital computer means located within a remote base station, said third digital computer means having a third display for processing and manipulating third data by a base station operator in response to an inquiry posed by the transit unit operator or the roving transit employee;

third storage media coupled to said third digital computer means for storing said third data;

means for communicating between the base station operator, the transit unit operator and the roving transit employee; and a third database for providing said third data as a plurality of sets of electronic entries for presentation on said third display.

5. The system according to claim 4, wherein said third digital computer means is a desktop computer.

6. The system according to claim 4, wherein said communicating means includes a Rf link between the transit unit operator, the roving transit employee and the base station operator.

* * * * *